Feb. 12, 1924.

B. S. SNOW 1,483,390

VALVE MECHANISM

Filed Oct. 11, 1920     2 Sheets-Sheet 1

Witness:
Stephen Rebora

Inventor:
Barton S. Snow,
by Dyrenforth, Lee, Chritton & Wiles, Atty's.

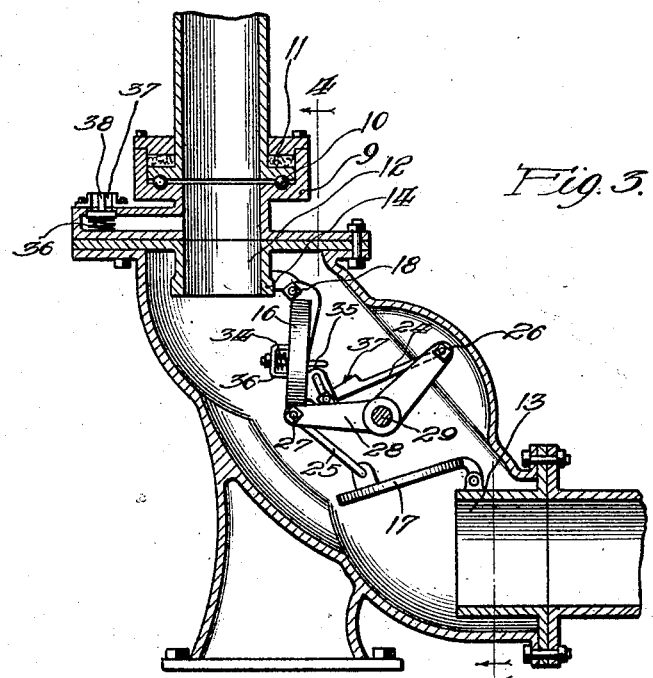
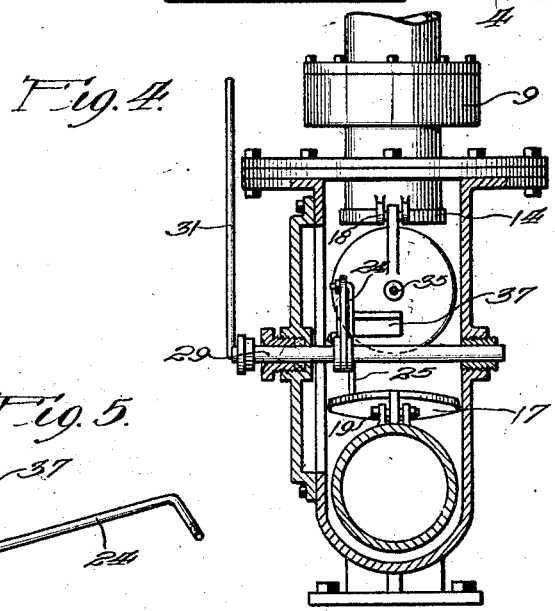
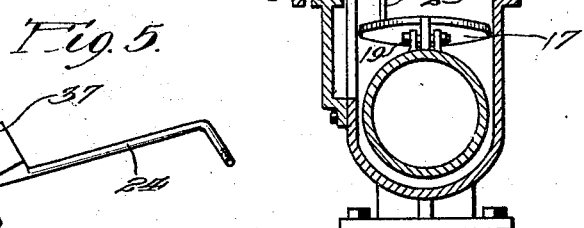

Patented Feb. 12, 1924.

1,483,390

UNITED STATES PATENT OFFICE.

BARTON S. SNOW, OF BATAVIA, ILLINOIS, ASSIGNOR TO T. W. SNOW CONSTRUCTION CO., OF CHICAGO, ILLINOIS, A CORPORATION OF ILLINOIS.

VALVE MECHANISM.

Application filed October 11, 1920. Serial No. 416,165.

*To all whom it may concern:*

Be it known that I, BARTON S. SNOW, a citizen of the United States, residing at Batavia, in the county of Kane and State of Illinois, have invented a new and useful Improvement in Valve Mechanism, of which the following is a specification.

My invention relates more particularly to valve mechanism for use in water-cranes to control the flow of water therethrough; and my primary objects are to provide a novel, simple and positively operating construction of valve mechanism which shall require the exertion of relatively slight force by the operator to open the valve. Further objects are to provide a structure wherein the minimum resistance to the flow of water through the stand-pipe by obstruction from the valve mechanism, is presented, and to provide an automtically closing valve which will operate in such a manner as to avoid water-hammer, and insure proper closure of the valve.

Figure 1:
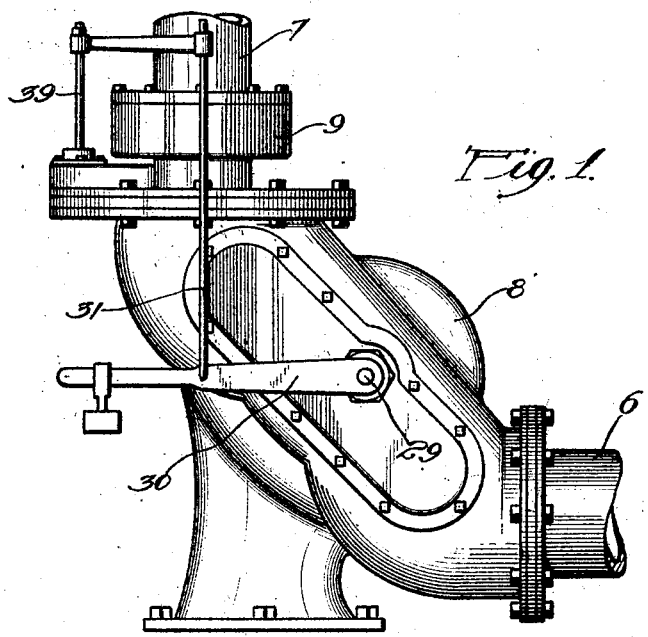
Figure 2:
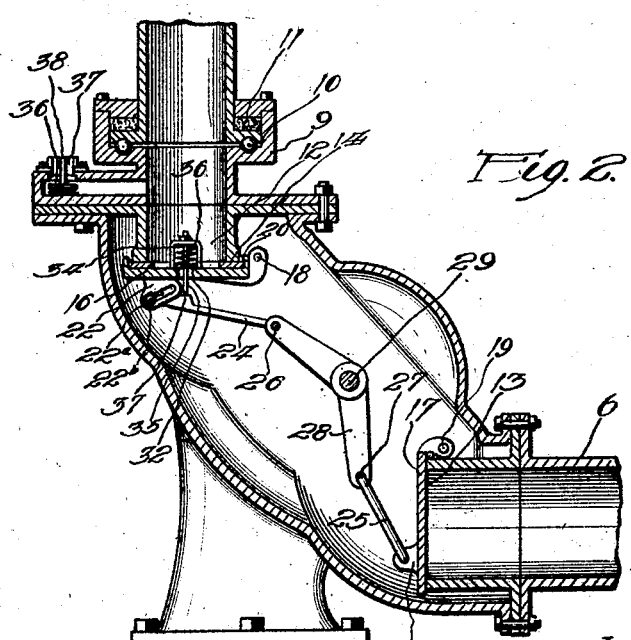

Referring to the accompanying drawings:

Figure 1 is a view in side elevation of the lower, valve-equipped, portion of a water-crane or stand-pipe equipped with valve mechanism in accordance with my invention. Figure 2 is a view in longitudinal sectional elevation of the construction shown in Fig. 1, showing the valve mechanism in closed condition. Figure 3 is a view like Fig. 2 of the mechanism therein shown, showing the valve mechanism in open condition. Figure 4 is a section taken at the irregular line 4—4 on Fig. 3 and viewed in the direction of the arrows; and Figure 5, a perspective view of one of the links forming a portion of the valve mechanism.

In the particular construction illustrated the pipe which leads into the bottom of the stand-pipe and which would be connected with any suitable source of water-supply, is represented at 6, and the vertical portion of the stand-pipe at 7, there being interposed between the adjacent ends of these two pipes, to communicate therewith, a valve housing 8.

The pipe section 7 is shown as rotatably supported on an extension 9 of the housing 8, the support being through the medium of a series of ball bearings 10 and the joint between these parts being packed as represented at 11. The valve housing 8 is provided at its upper end with a ported portion 12 which extends into the body of the valve housing and communicates with the pipe 7, and at its lower end with a ported portion 13 communicating with the pipe 6, the inner end of the ported portion 12 which forms a seat represented at 14 co-operating with a flap valve 16 which, as is usual in the case of flap-valves, is loosely pivoted, as indicated at 18, to a boss 20 on the member 12. The inner end of the ported portion 13 co-operates with a flap-valve 17 loosely pivoted, as indicated at 19, on the member 13. The valves 16 and 17 are provided with ears 22 and 23, respectively, apertured, as indicated, in which the ends of links 24 and 25, respectively, are pivoted, the other ends of these links being pivoted to the opposite ends, as indicated at 26 and 27, respectively, of a lever 28 located within the housing 8 and fixed on the shaft 29 journaled in the housing, the outer end of the shaft 29 having an arm 30 connected with an uprightly-extending operating rod 31 which would be operated in any desirable manner and through the medium of which the lever 28 and the valves controlled thereby are operated to open the pipes 6 and 7 to the housing 8. The pivot connection between the link 24 and valve 16 involves the slotting of the ear 22 as represented at 22ª and in which the pivot pin 22ᵇ on the link 24 extends and is shiftable lengthwise of the slot for a purpose hereinafter stated.

The flap-valve 16 contains a port 32 controlled by a valve 33 which opens upwardly against the action of a spring 34 shown as encircling a rod 35 rigidly secured to the valve 33 and forming a stem therefor and confined between the valve 33 and the base of a yoke member 36 secured to the upper side of the valve 16 and through which the stem 34 extends and is slidable, the valve thus provided being of the check type, with the spring so tensioned that it will resist the pressure of the water in the housing 8 exerted against the valve 33 and therefore hold the latter closed, except when operated as hereinafter described. The lower end of the stem 35 extends into the path of movement of a boss 37 (formed on the link 24), in the rotation of the shaft 29 in clockwise direction in Fig. 2.

The operation of the valve mechanism is as follows: Assuming the valve mechanism to be in the normal position represented in Figs. 1 and 2, wherein the valve housing 8 would be filled with water supplied from the pipe 6, and existing therein under substantially the same pressure, and the pivot pin 22$^b$ extends into the lower end of the slot 22$^a$, the valve mechanism is moved to open condition by the operator drawing up on the rod 31. In view of the sliding connection between the rod 24 and the valve 16 as stated, a slight movement of the rod 31, before the parts are moved sufficiently far to start to open the valve 16, causes the rod to swing upwardly, by reason of the inclined slot 22$^a$ and in such movement forces the check valve 33 upwardly, thereby affording a vent from the housing 8 to the pipe 7 which immediately causes the pressure to drop in housing 8. The pressure thus partially relieved in housing 8, the incoming water from the pipe 6 exerts a force on the valve 17 in a direction to continue the turning of shaft 29 and the opening of the valve 16, thereby aiding the operator in the actuation of the mechanism to a position in which both valves are fully open (Fig. 3).

In the arrangement shown it is required that the operator hold the rod 31 in raised position, to maintain the flap-valves 16 and 17 in the open condition represented in Fig. 3, and therefore, upon releasing upward pressure on the rod 31, these valves, under the weight of the valve-operating parts the weight of which is augmented in the structure illustrated by a weight represented at 30$^a$ on the end of the lever 30, are caused to move to a position in which the valve 16 becomes tightly seated against the seat 14 by reason of the water pressure against its under side, the valve 33 assuming closed position in thus seating valve 16.

It will therefore be understood from the foregoing that the valve mechanism may be moved to open condition with comparative ease and by the exertion of a very small amount of force on the part of the operator, and that the movement of the valve mechanism to closed position is automatically effected by the operator discontinuing upward pressure on the rod 31.

The structure is shown as provided with means for venting the pipe 7 of the water contained therein after the valve 16 closes, this means comprising an inwardly-opening check-valve 36$^x$ controlling a vent port 37$^x$ which opens into the interior of the pipe 7 as shown in Fig. 2, the valve 36$^x$ having a stem 38 which extends into the path of downward movement of a rod 39 connected with the valve-operating rod 31 through the medium of an arm 40; these parts being so positioned when the "main-valve-operating" parts of the structure are in the normal position shown in Figs. 1 and 2, the valve 36$^x$ will be open, but will automatically close upon the lifting of the rod 31 to open the main valves.

It will be noted that by the arrangement shown the closing of the valve is cushioned by the water as the valve 17 operates against the flow of water from pipe 6, thereby avoiding water-hammer.

The valve 33 also serves as a relief valve in case of the existence of excessive pressure in housing 8.

While I have illustrated and described a particular construction embodying my invention, I do not wish to be understood as intending to limit it thereto as the same may be variously modified and altered without departing from the spirit of my invention.

What I claim as new and desire to secure by Letters Patent is:

1. A valve mechanism comprising a housing having an inlet port and an outlet port, valves co-operating with said ports, the one of said valves co-operating with said inlet port opening in the direction of flow of the fluid through said housing and the other of said valves closing in the direction of flow of the fluid, said valves being connected together for movement in opposite directions, and means for reducing the pressure of fluid in the housing against the one of said valves controlling said outlet port, in the closed position of the latter.

2. A valve mechanism comprising a housing having an inlet port and an outlet port, flap-valves co-operating with said ports, the one of said valves co-operating with said inlet port opening in the direction of flow of the fluid through said housing and the other of said valves closing in the direction of flow of the fluid, said valves being connected together for movement in opposite directions, and means for reducing the pressure of fluid in the housing against the one of said valves controlling said outlet port, in the closed position of the latter.

3. A valve mechanism comprising a housing having an inlet port and an outlet port, valves cooperating with said ports, the one of said valves cooperating with said inlet port opening in the direction of flow of the fluid thru said housing and the other of said valves closing in the direction of flow of the fluid, said valves being connected together for movement in opposite directions, a third port opening into said housing, and a valve controlling said port and closing against the flow of fluid from said housing and operable to open position for reducing the pressure of fluid in the housing in the closed position of the valve controlling said outlet, said last-named valve being operable automatically to relieve the pressure in said housing when the pressure therein exceeds a predetermined degree.

4. A valve mechanism comprising a housing having an inlet port and an outlet port, valves co-operating with said ports, the one of said valves co-operating with said inlet port opening in the direction of flow of the fluid through said housing and the other of said valves closing in the direction of flow of the fluid, said valves being connected together for movement in opposite directions, and means for reducing the pressure of fluid in the housing against the one of said valves controlling said outlet port, in the closed position of the latter, and thereafter opening said valves.

5. A valve mechanism comprising a housing having an inlet port and an outlet port, valves co-operating with said ports, the one of said valves co-operating with said inlet port opening in the direction of flow of the fluid through said housing and the other of said valves closing in the direction of flow of the fluid, a port in said last-referred-to valve, a valve controlling said last-referred-to port, and means for operating said valves.

6. A valve mechanism comprising a housing having an inlet port and an outlet port, flap-valves co-operating with said ports, the one of said valves co-operating with said inlet port opening in the direction of flow of the fluid through said housing and the other of said valves closing in the direction of flow of the fluid, a port in said last-referred-to valve, a valve controlling said last-referred-to port, and means for operating said valves.

7. A valve mechanism comprising a housing having an inlet port and an outlet port, valves co-operating with said ports, the one of said valves co-operating with said inlet port opening in the direction of flow of the fluid through said housing and the other of said valves closing in the direction of flow of the fluid, a port in said last-referred-to valve, an automatically closing valve controlling said last-referred-to port, and means for operating said valves.

8. A valve mechanism comprising a housing having an inlet port and an outlet port, valves co-operating with said ports, the one of said valves co-operating with said inlet port opening in the direction of flow of the fluid through said housing and the other of said valves closing in the direction of flow of the fluid, a port in said last-referred-to valve, a valve controlling said last-referred-to port, and means for opening said last-referred-to valve to reduce the pressure of the fluid against the one of said valves controlling said outlet port, and thereafter moving said first-referred-to valves to open condition.

9. A valve mechanism comprising a housing having an inlet port and an outlet port, valves co-operating with said ports, the one of said valves co-operating with said inlet port opening in the direction of flow of the fluid through said housing and the other of said valves closing in the direction of flow of the fluid, a port in said last-referred-to valve, a valve controlling said last-referred-to port, said first-named valves being connected together for movement in opposite directions, and means operating to open the valve which controls the port in the one of said valves which controls said outlet port.

10. A valve mechanism comprising a housing having an inlet port and an outlet port, a valve co-operating with said outlet port and closing in the direction of the flow of fluid through said housing, means for reducing the pressure of fluid in the housing against said valve when the latter is in closed position, and means extending into the flow of fluid through said housing and operated thereby for exerting force on said valve tending to open the latter.

11. A valve mechanism comprising a housing having an inlet port and an outlet port, a valve co-operating with said outlet port to close in the direction of the flow of fluid through said housing, a port in said valve, a valve controlling said last-referred-to port, and means extending into the flow of fluid through said housing operating to open said second-referred-to valve and operated by the flow of water through said housing to exert a force on said first-referred-to valve in a direction tending to open the latter.

12. A valve mechanism comprising a housing having an inlet port and an outlet port, a valve co-operating with said outlet port and closing in the direction of the flow of fluid through said housing, said valve containing a port, a second valve controlling said port, and means, extending into the flow of fluid through said housing operable manually, for first opening said second valve and operated by the flow of fluid through said housing for thereafter opening said first-named valve.

13. A valve mechanism comprising a housing having an inlet port and an outlet port, a valve co-operating with said outlet port and closing in the direction of the flow of fluid through said housing, said valve containing a port, a second valve controlling said port, a valve-operating shiftable member engaging said first-named valve and operating when shifted to first open said second valve and thereafter open said first-named valve, and a member engaging said shiftable member and extending into the flow of fluid through said housing and operating under the action of the incoming fluid to tend to open said first-named valve and resist by the action of the fluid thereagainst it the closing of said first-named valve.

14. A valve mechanism comprising a housing having an inlet port and an outlet port, valves cooperating with said ports, the one of said valves cooperating with said inlet port opening in the direction of flow of the fluid through said housing and the other of said valves closing in the direction of flow of the fluid, said valves being connected together for movement in opposite directions, a third port opening into said housing, and a valve controlling said third port operable for reducing the pressure of fluid in the housing in the closed position of the one of said valves controlling said outlet port.

15. A valve mechanism comprising a housing having an inlet port and an outlet port, valves cooperating with said ports, the one of said valves cooperating with said inlet port opening in the direction of flow of the fluid thru said housing and the other of said valves closing in the direction of flow of the fluid, said valves being connected together for movement in opposite directions, a third port opening into said housing, and a spring-tensioned valve controlling said third port operable for reducing the pressure fluid in the housing in the closed position of the one of said valves controlling said outlet port, and automatically movable to closed position.

16. A valve mechanism comprising a housing having an inlet port and an outlet port, valves cooperating with said ports, the one of said valves cooperating with said inlet port opening in the direction of flow of the fluid thru said housing and the other of said valves closing in the direction of flow of the fluid, a port in said last-referred-to valve, and a valve controlling said last-referred-to port.

17. A valve mechanism comprising a housing having an inlet port and an outlet port, valves cooperating with said ports, the one of said valves cooperating with said inlet port opening in the direction of flow of the fluid through said housing and the other of said valves closing in the direction of flow of the fluid, a third port opening into said housing, and an automatically closing valve controlling said last-referred-to port.

18. A valve mechanism comprising a housing having an inlet port and an outlet port, a valve cooperating with said outlet port, to close in the direction of the flow of fluid thru said housing, a third port opening into said housing, a valve controlling said last-referred-to port, and means extending into the flow of fluid thru said housing operable manually to open said second-referred-to valve and operable by the flow of fluid through said housing to exert a force on said first-referred-to valve in a direction tending to open the latter.

19. A valve mechanism comprising a housing having an inlet port and an outlet port, a flap-valve cooperating with said outlet port and closing in the direction of the flow of fluid thru said housing, said valve containing a port, a second flap-valve cooperating with said inlet and opening in the direction of flow of fluid thru said inlet, a third valve controlling the port in said outlet valve, a spring normally holding said valve in closed position, a rock-shaft, and mechanism connected with said rock-shaft and connecting the latter and said inlet and outlet valves, whereby when said rock-shaft is rocked in one direction said inlet and outlet valves move in opposite directions, and operating in the initial movement of said rock-shaft to open said third valve before said outlet valve is moved out of closed position.

BARTON S. SNOW.